Figure 1:
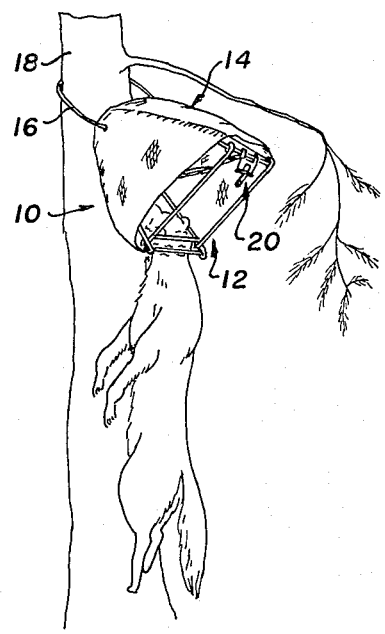

United States Patent [19]
Gabry

[11] 3,896,581
[45] July 29, 1975

[54] ANIMAL TRAP

[76] Inventor: William Gabry, Box 10, Vavenby, British Columbia, Canada

[22] Filed: Sept. 26, 1973

[21] Appl. No.: 400,822

[52] U.S. Cl. ................................. 43/81; 43/81.5
[51] Int. Cl. ........................................ A01m 23/24
[58] Field of Search .............. 43/77, 81, 85, 78, 92, 43/97, 89

[56] References Cited
UNITED STATES PATENTS

| | | | |
|---|---|---|---|
| 477,966 | 6/1892 | Steiner | 43/85 |
| 2,242,648 | 5/1941 | Rocca | 43/85 |
| 2,723,486 | 11/1955 | Bouma | 43/85 |
| 3,534,493 | 10/1970 | Dahlgren | 43/85 |

*Primary Examiner*—Warner H. Camp
*Attorney, Agent, or Firm*—Fetherstonhaugh & Co.

[57] ABSTRACT

An animal trap having a wire frame enclosed by a hood to provide an entrance opening. The wire frame provides a striker jaw and a fixed jaw disposed on opposite sides of the entrance opening when the trap is set and baited. Means are provided for suspending the trap a suitable distance above the surface of the ground so that an animal standing upright beneath the trap can reach the bait only by entering its head into the entrance. The bait is attached by a trigger assembly mounted within the frame above the entrance opening and, when the bait is touched, the trigger assembly is actuated to release one spring-powered striker jaw whereby to break the animal's neck against the fixed jaw thus killing quickly and humanely.

3 Claims, 6 Drawing Figures

PATENTED JUL 29 1975  3,896,581

SHEET 1

ANIMAL TRAP

My invention relates generally to an animal trap and more particularly to an instant-kill trap for fur bearing animals.

The trapping of animals for their furs has long been recognized as the cause of a great deal of unnecessary suffering because of the way most conventional traps operate. Such traps generally are leg traps which are designed to seize and hold one leg of the animal. This, of course, does not kill the animal for which the trap was set and very often a long and painful struggle occurs before the trapper arrives to put the suffering animal out of its misery. Furthermore, other animals of no commercial value, as well as birds such as owls, jays and crows, will attempt to rob a conventional trap of its bait and the results are usually fatal so that much useless killing takes place. The sprung trap must be cleared of the dead bird or non-commercial animal and reset before it can again serve its intended purpose and this means more work and fewer marketable furs for the trapper.

I overcome the several disadvantages of conventional traps by providing a humane trap which enables selective trapping to be practiced, that is, it can be operated in such a way as to attract a land animal of a particular size and species and is not likely to be interferred with by other animals or birds. This is achieved by suspending the trap above the surface of the ground and providing only one bottom opening which will admit the head of an animal. When the trap is sprung with the animals' head in the bottom opening, death is almost instanteous since invariably the neck is broken. The pelt is not damaged by the trap and the above-ground position of the trapped animal protects the pelt to some extent at least from attack by ground rodents which can destroy a pelt before it is collected.

Figure 3:
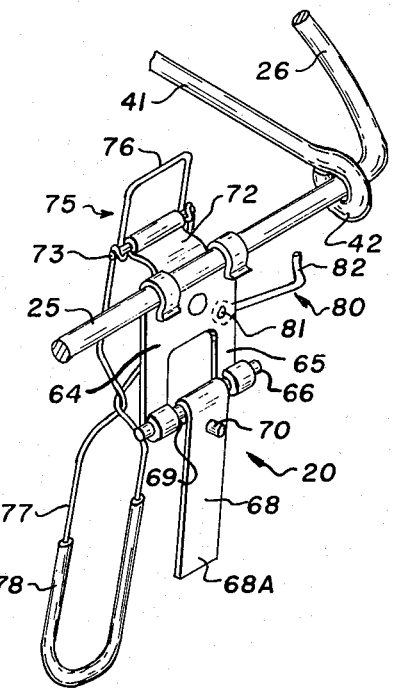
Figure 2:
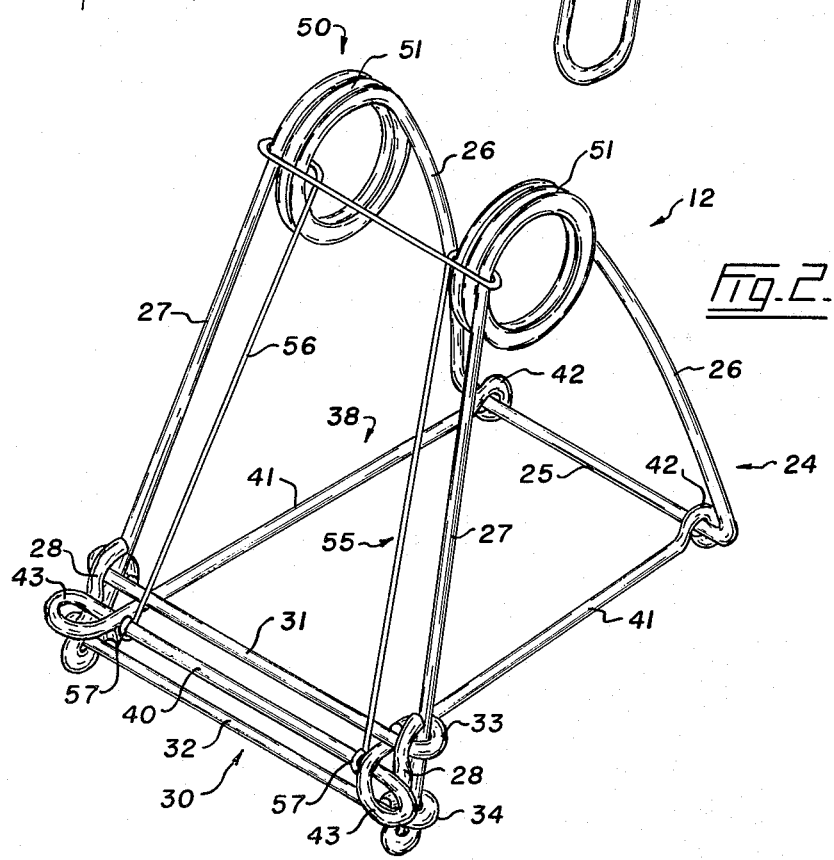
Figure 4:
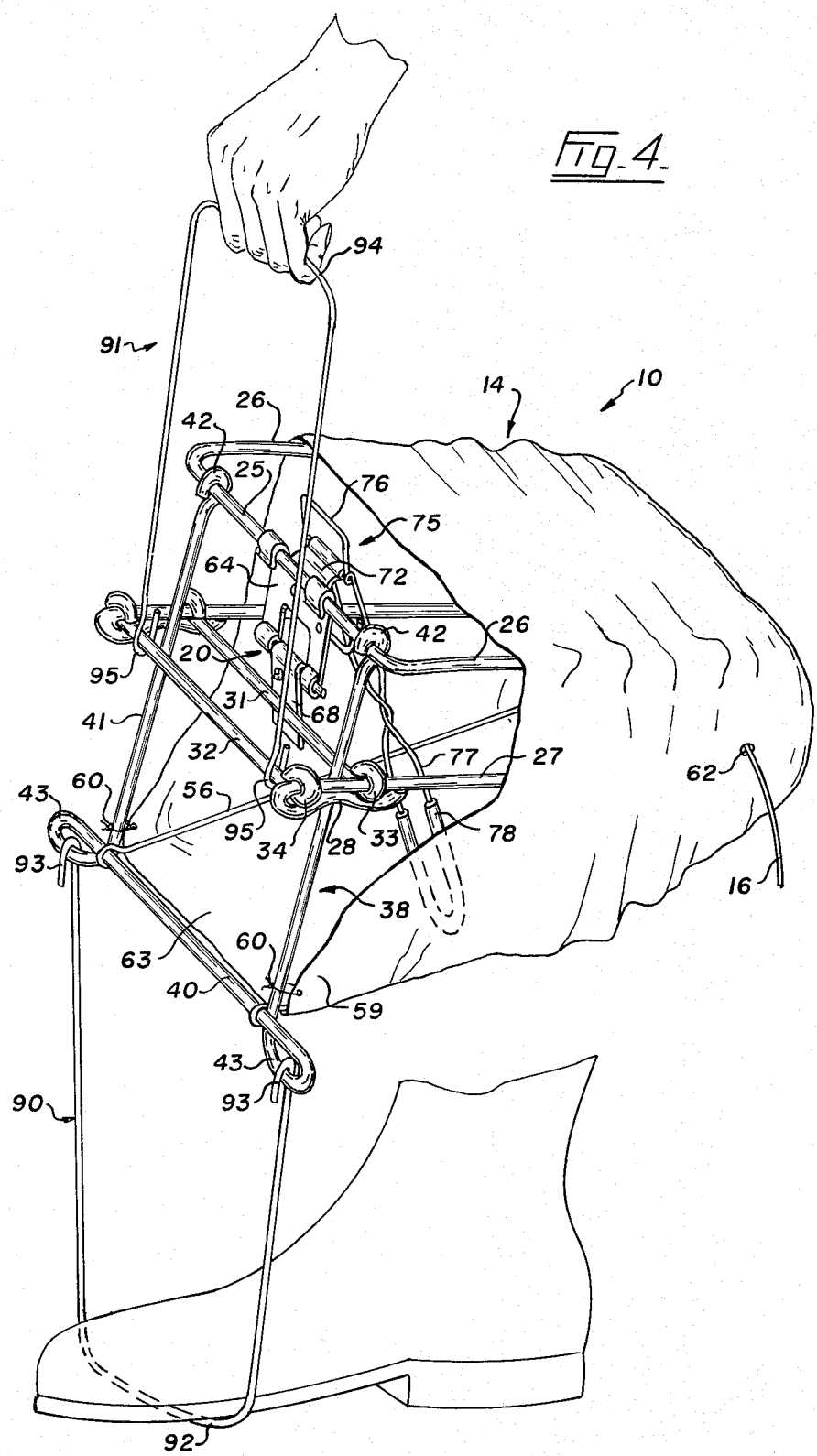
Figure 5:
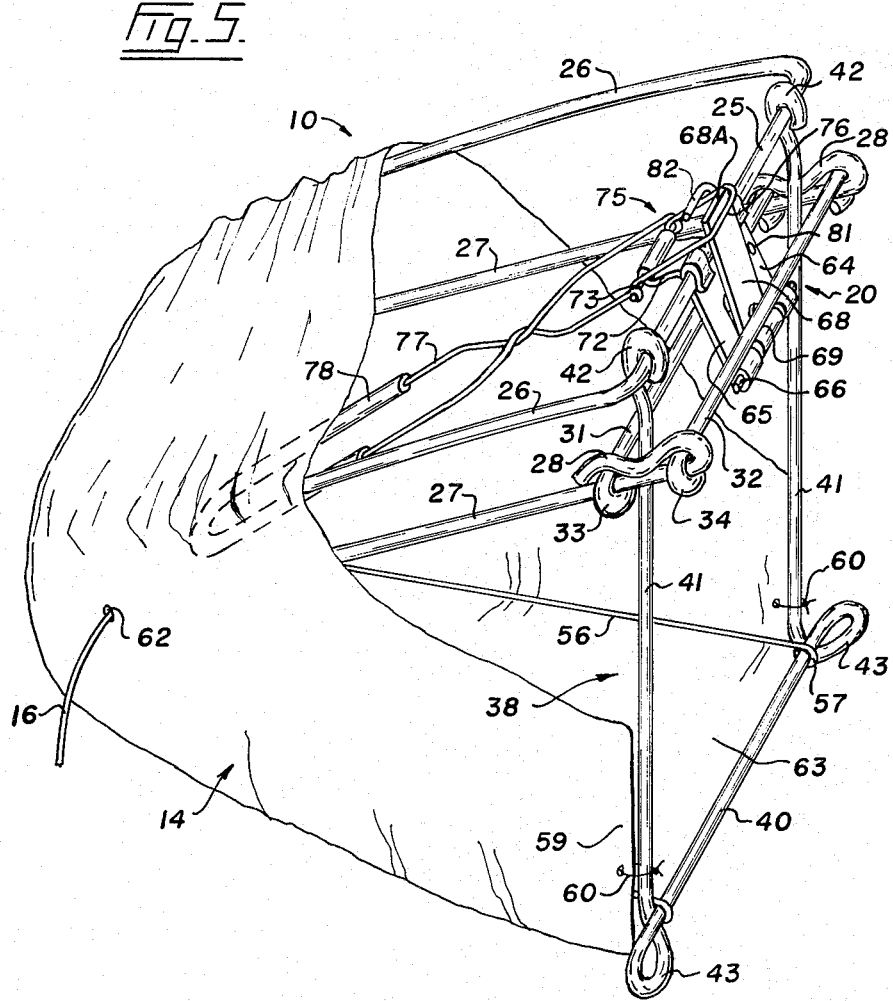
Figure 6:
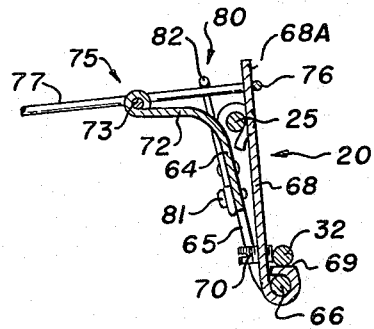

In drawings which illustrate a preferred embodiment of the invention,

FIG. 1 is a small scale perspective view of an animal trap constructed in accordance with the present invention, FIG. 2 is a perspective view showing a frame of the trap with a hood which normally encloses the frame and a trigger assembly which holds the trap in set position both purposely omitted for the sake of clarity, FIG. 3 is a perspective view of the trigger assembly, FIG. 4 is a perspective view showing the trap being set with a portion of the hood rolled back for that purpose, FIG. 5 is a perspective view of the set trap, and FIG. 6 is a vertical section of the trigger assembly in set position.

Referring to the drawings, the numeral 10 indicates generally a trap constructed in accordance with the present invention. The trap 10 comprises a frame 12 which is fitted with a hood 14 and, in FIG. 1, the trap is shown in a typical position of use secured by means of a cord 16 or the like to a sapling 18. This leaves the open or unhooded underside of the trap spaced a suitable distance above the surface of the ground, or the surface of snow upon the ground, so that an animal such as a marten can approach the trap and be tempted to poke his head into the only available opening in an attempt to seize bait supported within the trap on a trigger assembly 20.

The frame generally indicated at 12 is shown in FIG. 2 minus the hood 14 and the trigger assembly 20 and the frame will be seen to comprise side portions 24 which are formed of a length of spring wire. The wire is shaped to provide each portion 24 with a front bar 25 and upwardly converging corner bars 26 and 27. The rear corner bars 27 have lower ends 28 which are turned upwardly to support a striker jaw 30. Two vertically spaced and parallel bars 31 and 32 form the striker jaw 30 and, preferably, the opposite ends 33 and 34 of these upper and lower bars are simply folded around the rear corner bars 27 and are held against movement thereon by means of the upwardly turned lower ends 28.

Frame 12 has a bottom portion generally indicated at 38 and preferably this portion is also formed of another length of the same type of spring wire. The wire in this instance is shaped to provide a fixed jaw 40 and parallel side bars 41, with ends 42 of the side bars being folded over the front bar 25. These side bars 41 project freely between the upper and lower bars of the striker jaw 30 and, at the junctions of said side bars and the fixed jaw 40, the wire is looped to provide stops 43 which are engaged by the upturned ends 28 when the trap is released under spring pressure.

The trap 10 has spring means generally indicated at 50 for biasing the striker jaw 30 towards the fixed jaw 40 and the spring wire construction of the frame is utilized to provide this means whereby the jaws are held tightly together. As shown in the drawings, the means 50 comprises a number of loops 51 which are formed by turns of the spring wire where each front corner bar 26 joins a rear corner bar 27. Such a spring means ensures that a considerable amount of pressure is required to move the striker jaw 30 towards the front bar 25 or, in other words, to move the upturned ends 28 out of engagement with the stop loops 43 whereby to set the trap.

When the trap is set as will be described later, the striker jaw 30 is positioned alongside the front bar 25 and the rear of the bottom portion 38 is supported at this time by hanger means generally indicated at 55. As shown best in FIG. 2, the means 55 comprises a length of relatively light wire 56 which is folded upon itself to extend across the top of the frame 12, through the loops 51, thence downwardly substantially parallel to the rear corner bars 27. Lower ends 57 of the wire are folded over the fixed jaw 40 adjacent the stop loops 43.

From the above description of the frame 12, it will be apparent it is a substantially dome-shaped structure which is light in weight and extremely strong. The hood 14, which preferably is made of heavy canvas, is correspondingly shaped to fit over the frame so that lower edge 59 of the canvas is disposed in the vicinity of the bottom portion 38. A cord tie 60 (FIGS. 4 and 5) is used to secure the lower edge 59 to each corner of the frame and in such a manner as not to interfere with the opening and closing movement of the jaw 30. The cord 16 extends through the loops 51 in the side portions and the cord is also threaded through openings 62 in the canvas to secure the upper part of their hood to the frame. This arrangement of the hood 14 leaves only the underside of the trap uncovered and here a rectangular entrance opening 63 is defined by the bottom portion 38 and the front bar 25. Entrance opening 63 is of a size which will readily admit the head and neck of the fur-bearing animal the particular trap is designed to catch.

The trigger assembly 20 of the present trap is shown best in FIG. 3 to comprise a base plate 64 which is swingably mounted on the front bar 25 of the frame so that the several parts of the assembly normally would hang downwardly as illustrated in this view when the unset trap is suspended from above. The unhinged end of the plate 64 is shaped as a fork 65 which is rolled to support a pin 66 extending parallel to the bar 25. Pivotally mounted on the pin 66 is a sear 68 having a seat 69, see particularly FIG. 6. Near this seat, the sear 68 is fitted with an adjusting screw 70.

Plate 64 has an upwardly and rearwardly projecting extension 72 which carries a pin 73 also extending parallel to the front bar 25. The pin 73 serves to pivotally mount a trigger 75 which is formed of a length of relatively fine wire, the wire being shaped to provide a U-shaped bale 76 on one end thereof and an elongated loop 77 on the opposite end. This loop 77 supports bait (not shown) for the trap 10 and, in order to keep the bait from freezing to the trigger, the loop 77 preferably is fitted with a plastic cover 78.

Finally, the plate 64 is fitted with a safety catch 80. A pivot pin 81 secures one end of the wire safety catch 80 to the face of the plate adjacent the trigger and the opposite end of the catch is formed into a hook 82.

As previously mentioned, the trap 10 requires a great deal of force to set and therefore each trap comes equipped with a stirrup 90 and a handle 91 as shown in FIG. 4 only. The stirrup 90 is a U-shaped length of wire having a foot rest 92 at one end and hooks 93 at the opposite end. Handle 91 is similarly shaped although it has a rounded hand grip 94 at one end and hooks 95 at the other end.

To bait and set the trap 10, a piece of meat (not shown) or the like is secured to the plastic-covered loop 77 of the trigger 75. The trap is held in the position shown in FIG. 4 and some of the ties 60 which secure the lower edge 59 of the hood to the frame are loosened so that the hood can be rolled back slightly whereby the trapper can enter the fingers of one hand between the corner bars 26 which are then uppermost. The hooks 93 of the stirrup are then entered into the stop loops 43 of the fixed jaw while the hooks 95 of the handle are looped over the bar 32 of the striker jaw. The foot rest 92 is placed on the ground and the trapper holds it down by placing one foot in the stirrup while pulling upwardly on handle 91 using one hand. This use of the stirrup and handle enables the trapper to apply the pressure required to move the striker jaw 30 close to the rear bar 25 whereupon the trigger assembly 20 can be actuated by use of the trapper's other hand which is entered into the frame only through the space between the corner bars 26 so as to be out of danger should the trap release accidentally during the setting operation.

Before opening the jaws in the above described manner, the sear 68 is swung about the pivot pin 66 so that free end 68A thereof projects above and is in contact with bar 25. The trigger 75 is then positioned so that the bale 76 extends over the end 68A of the sear whereupon the bar 32 of the striker jaw is placed on the seat 69 of the sear. At this time, it is advisable to swing the safety catch 80 about the pivot pin 81 so that the hook 82 thereof extends over the bale 76 of the trigger as shown in FIGS. 5 and 6 whereby to avoid accidental release of the striker jaw.

The bar 32 of the striker jaw is now held firmly on the seat 69 of the sear by the considerable force exerted by the spring means 50 and the trap is set. It will be noticed particularly in FIG. 6 that the effective width of the seat 69 can be varied by adjustment of the screw 70 and this adjustment, of course, is done before the trap is set. Thus, the adjustment screw 70 enables the trapper to select a setting which will provide the assembly 20 with a "hair trigger" action or a less sensitive action.

The handle 91 and stirrup 90 are detached from the frame 12 and the set trap is suspended in the position of use shown in FIG. 1. At the last moment, the safety catch 80 is released and the hood 14 is retied to the frame. The trap is now upright and the bait can be seen and sensed by an animal standing on the ground and looking up into the frame.

Assuming the bait is intended to attract marten, this small animal will approach the trap and stand upright to enter his head into the bottom opening 63 so as to seize the bait in his mouth. The moment the trigger 75 is moved by the marten tugging at the bait, the bale 76 is pulled over the end 68A of the sear. The bar 32 of the spring-pressed striker jaw rocks the sear 68 about the pivot pin 66 and away from the base plate 64 whereupon said bar drops off the seat 69 to allow the striker jaw 30 to snap towards the fixed jaw 40. Thus, the animal is caught by the neck between the two jaws of the trap and usually the widely spaced bars 31 and 32 of the striker jaw and the single intermediate bar of the fixed jaw 40 apply a blow which breaks the neck of the animal.

From the foregoing, it will be apparent I provide a humane trap which kills an animal quickly by breaking its neck and without damaging the pelt. The trap is quite easy to set with the tools provided and is relatively safe when a few simple precautions are followed. When the lightweight trap is suspended well above the ground, the canvas hood prevents it being triggered by birds since only the bottom entrance opening provides access to the bait. The simply constructed and inexpensive quick-kill trap can be varied in size and used in a particular location so as to be more likely to trap one animal than another and this permits more selective trapping to be done than is possible with most conventional traps.

I claim:

1. A trap comprising a wire frame having side portions and a bottom portion, said side portions each having front and rear corner bars interconnected by a front bar, a striker jaw interconnecting the front corner bars, said bottom portion having side bars secured at ends thereof to the front bar and connected at opposite ends thereof by a fixed jaw, said striker jaw including upper and lower bars spaced one on either side of the fixed jaw, said front and rear corner bars being connected by loops biasing the striker jaw towards the fixed jaw, stop means on the fixed jaw engageable by a frame part when the trap is sprung, said bottom portion and front bar defining an entrance opening for the head of an animal, a hood covering substantially all of the frame except the entrance opening, a trigger assembly mounted on the front bar to support the striker jaw in a set position across the entrance opening from the fixed jaw, said trigger assembly including a base plate, a sear pivotally mounted on the base plate and having a seat adapted to receive a part of the striker bar when the trap is set, and a bait supporting trigger pivotally mounted on the base plate above the entrance opening to releasably engage the sear.

2. A trap as claimed in claim 1, and including a safety catch mounted on the base plate for movement into and out of engagement with the bait-supporting trigger.

3. A trap as claimed in claim 1, and including an adjustment screw mounted on the base plate to vary the effective width of the sear seat.

* * * * *